United States Patent [19]

Colburn

[11] Patent Number: 4,537,740
[45] Date of Patent: Aug. 27, 1985

[54] FISSION GAS DETECTION SYSTEM

[75] Inventor: Richard P. Colburn, Pasco, Wash.

[73] Assignee: The United States of America as represented by the United States Department of Energy, Washington, D.C.

[21] Appl. No.: 480,961

[22] Filed: Mar. 31, 1983

[51] Int. Cl.³ ............................................. G21C 17/00
[52] U.S. Cl. .................... 376/256; 376/253; 376/313
[58] Field of Search ............... 376/251, 252, 253, 245, 376/256, 439, 313, 314

[56]  References Cited

U.S. PATENT DOCUMENTS

| | | | |
|---|---|---|---|
| 3,070,532 | 12/1962 | Zebroski | 376/253 |
| 3,178,355 | 4/1965 | Jacobs | 376/253 |
| 3,234,101 | 2/1966 | Berthod | 376/253 |
| 3,240,674 | 3/1966 | Ledwidge | 376/245 |
| 3,350,271 | 10/1967 | Maidment et al. | 376/252 |
| 3,357,891 | 12/1967 | Wadmark | 376/253 |
| 3,649,473 | 3/1972 | Holden et al. | 376/256 |
| 3,658,485 | 4/1972 | Gramer . | |
| 3,683,272 | 8/1972 | Vissers et al. | 376/256 |
| 3,797,299 | 3/1974 | Nelson et al. | 376/256 |
| 3,856,620 | 12/1974 | Tomabechi | 376/253 |
| 3,878,040 | 4/1975 | Martucci | 376/253 |
| 3,936,348 | 2/1976 | Wachter et al. | 376/252 |
| 3,941,652 | 3/1976 | Delisle et al. | 376/253 |
| 4,039,379 | 8/1977 | Wachter | 376/439 |
| 4,126,514 | 11/1978 | Wonn | 376/252 |
| 4,299,661 | 11/1981 | Campana | 376/251 |

FOREIGN PATENT DOCUMENTS 303656  7/1971  U.S.S.R. ............................. 376/253

Primary Examiner—Sal Cangialosi
Attorney, Agent, or Firm—Edward W. Nypaver; Robert Southworth, III; Judson R. Hightower

[57]  ABSTRACT

A device for collecting fission gas released by a failed fuel rod which device uses a filter to pass coolant but which filter blocks fission gas bubbles which cannot pass through the filter due to the surface tension of the bubble.

6 Claims, 3 Drawing Figures

4,537,740

FISSION GAS DETECTION SYSTEM

GOVERNMENT CONTRACT

This invention was conceived during performance of a U.S. Government Contract designated DE-AC06-76FF02170.

BACKGROUND OF THE INVENTION

This invention relates to systems used to detect and locate failures of the cladding of fuel rods in nuclear fuel assemblies used in nuclear reactors, especially sodium cooled nuclear reactors.

Nuclear reactors contain a fuel core which is a grouping of fuel assemblies each of which has a plurality of fuel rods. A fuel rod is a cylindrical, metal tube which contains nuclear fuel pellets. The metal of the tube separates the fuel pellets from reactor coolant which flows over the surface of the tube or cladding.

A penetration of the cladding, termed a fuel failure, may allow fission fragments, particularly gases, to escape from the fuel rod into the reactor coolant. These gases may mingle with the gas contained in a cover gas region which is usually a feature of liquid metal cooled reactors.

Nuclear reactors are expected to experience fuel failure in spite of rigorous quality control and conservative operating procedures. Most of the failures result from pin-hole cracks in the cladding and/or end plug welds. Such failures are now detected by analysis of fission-gas outside the core (e.g., in the reactor cover gas) and by observation of delayed neutron precursors in the reactor coolant.

One of the problems faced by reactor instrumentation is to detect and monitor failed fuel in such a manner that safe operation of the reactor is not impaired. This problem can be solved by having the ability to quickly obtain and analyze samples of fission gas released by failed fuel. There is a major need to locate the leaking fuel assembly rapidly in order to expedite its removal and minimize reactor down time.

Consequently, it is desired to provide a method for obtaining a sample of fission gas from reactor coolant and quickly identify the leaking assembly.

SUMMARY OF THE INVENTION

A sample of fission gas which may have been released by fuel pins into the reactor coolant via cladding defects is obtained as per this invention by passing a portion or all of the reactor coolant flow through a filter having holes therein of size appropriate in consideration of the pressure drop across the filter, to cause bubbles of fission gas entrained within the reactor coolant to be restrained from passage through the filter due to the surface tension forces on the bubble.

DETAILED DESCRIPTION

The invention acts on a stream of reactor coolant immediately after passage through the fuel core of the reactor.

Figure 2:
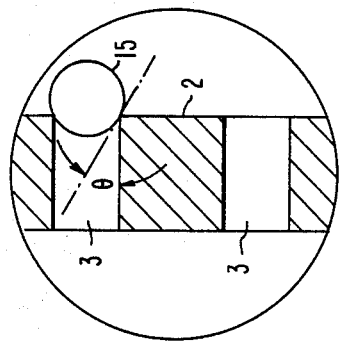
FIG. 2 is a detail from FIG. 1.
Figure 1:
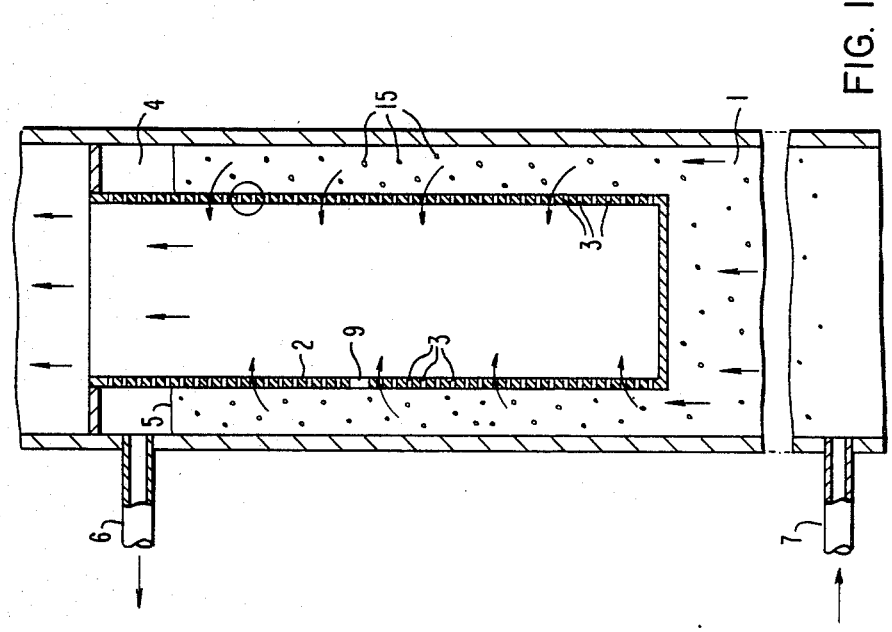
FIG. 1 is a schematic of a first embodiment.

A first embodiment is illustrated schematically in FIG. 1. A stream of coolant 1 from the core, containing entrained gas bubbles 15 enters from the bottom. A cylindrical filter element 2, with a pore 3 size of $<100\mu$ meters, would be wetted by the coolant as it passes through filter 2. When an entrained fission gas bubble 15 contacts filter 2 in the vicinity of a pore 3, (it must displace the liquid in the pore to pass) then a balance of forces is set up between the liquid, solid filter and gas interfaces as illustrated schematically in the expanded view of FIG. 2. As the gas attempts to pass through pore 3 it exerts a pressure $\Delta P$ over the pore opening forming a miniscus with contact angle $\theta$. The balance of forces may be expressed:

$$\Delta P \pi r^2 = 2\pi r \sigma \cos\theta; \quad \sigma = \text{surface tension (dynes/cm)} \quad (1)$$

For the bubble to pass through pore 3, $\Delta P$ must be large enough to that $\theta \rightarrow 0$ ($\cos\theta \rightarrow 1$). For pressure drops below this value the gas will accumulate in annulus 4 near the upper end of the filter. As the gas accumulation continues it will tend to expand and displace the fluid-gas interface 5 downward. This would tend to decrease the useful surface area of the filter which would increase the pressure drop and decrease the total liquid flow through the filter. To prevent gas blanketing of an excessive area of the filter, the gas could be bled-off through outlet 6. Alternatively the system may be designed to allow the gas blanket accumulation to increase the pressure drop across the filter to the critical pressure and start to force some of the accumulate gas through the filter. Any subsequent gas bubbles arriving with the coolant would continue to mix with the gas blanket but a bleed of the gas blanket would pass through the filter.

In general it is preferred to periodically draw off the accumulated gas to check for fission gas.

The actual volume of fission gas released from a breached rod is relatively small ($<<1l$) and the system could be operated in a continuous "feed and bleed" mode in which a stream of inert gas would be added to the coolant stream upstream from the filter at inlet 7 and continuously bled-off at outlet 6 to provide a continuous gas sample stream. This sample would be enriched in fission gas when rod failure occurred. The "feed and bleed" mode would also provide a sparging action to disengage any dissolved fission gas. After the gas was drawn off it would be routed past a scintillation detector and mass spectrometer for conventional analysis.

The system could be designed to accommodate the desired coolant flow rate with a pressure drop across the filter below the critical pressure drop which would force gas through pores 3. This would be accomplished by proper selection of the pore size and filter surface area.

Sample Calculation

The critical $\Delta P$ may be calculated from equation (1) for a given value of $r$ and $\sigma$ $$\Delta P_c = [(2\sigma \cos\theta)/r] \rightarrow (2\sigma/r) \text{ for } \cos\theta \rightarrow 1$$

For liquid sodium at 500° C., $\sigma = 210$ dynes/cm. For a 10 $\mu$m pore diameter $r = 5 \times 10^{-4}$ cm. ($r$ = radius of pore)

$$\Delta P_c = 8.2 \times 10^5 \text{ dynes/cm}^2 \approx 11 \text{ psi}.$$

Figure 3:
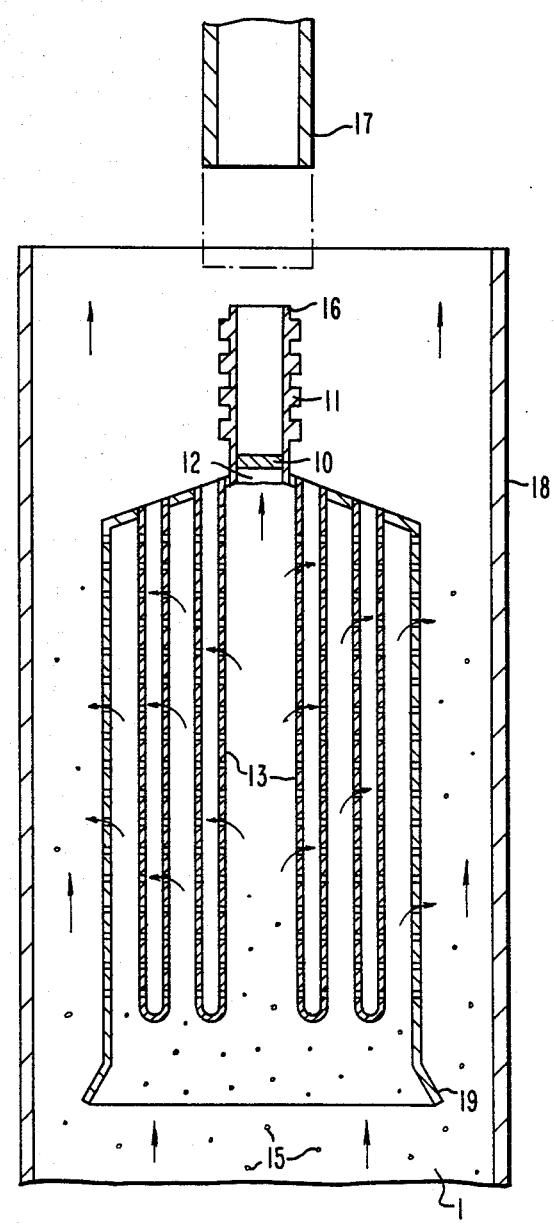
FIG. 3 is a schematic of a second embodiment.

A second embodiment is illustrated schematically in FIG. 3. The device locates a filter 10, of relatively small area, in a tube 11 at a high point in a fission gas disengagement device. Typically this would be in or near the upper end of each fuel assembly in the reactor. During initial operation all filters would be wetted by the coolant and coolant would flow through tube 11. The flow rate through tube 11 would be comparable to that through an equal area of filter on the main gas disengagement filter 13. If a fuel element should rupture and leak fission gas, the gas disengagement device on the assembly will intercept some representative fraction (say 10 to 20%) of the assembly effluent and will strip the entrained gas bubbles from it. The buoyant forces on the entrapped gas will tend to concentrate it at the upper end 12 of the disengagement device where the small tube filter 10 is located. The accumulation of gas will lead to gas blanketing of the small filter 10 and ultimately complete blockage of coolant flow through small tube 11. A device (not shown) such as an eddy current sensor would monitor the accumulation of fission gas intercepted by the larger filter. A wide range of gas detection methods or associated sodium displacement measurements may be applied. If the device is located within the upper end of the fuel assembly, the sipping devices (17) could be mated to the outlet nozzle (16) to sample for accumulated gas.

If the device were located above the fuel assembly it could contain sensors such as eddy current devices to detect the accumulation of gas below the small filter. This would permit continuous remote monitoring of each fuel assembly.

The sipping operation could be performed immediately after detection of gas by the sensor or it might be delayed to some more convenient time such as a scheduled shutdown. Then each of the assemblies containing leaking rods could be identified, verified and removed. The presence of several leakers or even the simultaneous occurrence of several leakers would not interfere with identification. Since the inventory of released gas would be retained by the filter until sampling was performed, there would be not need to immediately identify the leaker when it occurs (as in the case of gas tagging). Similarly, if the gas sampling and analysis system was down when one or more of the leaks occur, there is no irreversible loss of identification capability. Since the device accumulates the fission gas over the entire period the assembly operates in the breached condition, it does not depend on inducing fission gas release from the breached rods at the time of sampling.

For the sipping operation the sipping device 17 would be mated to the filter tube outlet 16 or the sipping system could be permanently attached to the outlet nozzle as part of a stationary sipping system with a common manifold system or rotary selector valve. By rapidly drawing on this tube the critical pressure drop across the small filter would be exceeded and the accumulated gas would be drawn through the filter up into the gas sampling stage where it could be analyzed to confirm the presence of fission gas and determine the amount.

The gas accumulation monitoring in the tubes provides a simple and rapid method for fuel failure detection and location. The sipping procedure allows the verification of leaker identity. The filter device is a simple passive unit with no moving parts.

EXAMPLE

In a typical installation, (see FIG. 3) the main gas disengagement filter for a full size fuel assembly could be a cylinder 18 3-inch in diameter by 6-inches long surrounding 12 tubular filters 13 0.5-inch diameter by 6-inches long. This would provide approximately 1 ft$^2$ of filter surface. A deflector cone 19 would be designed to create approximately 5 psi pressure drop across the filter when the full assembly flow was at its rated 500 gpm. A 10 $\mu$m scintered stainless steel filter will allow about 20 gpm/ft$^2$/psi pressure drop. Then the 5 psi across 1 ft$^2$ would accommodate 100 gpm flow or about 20% of the total fuel assembly flow. With good mixing in the assembly it can be assumed about 20% of the released gas would be intercepted by the main filters. Even if only 10 ml of gas were released by the breached rod, the 2 ml captured by the gas disengagement filter would be enough to gas blanket the small filter. During the sipping operation application of >10 psi pressure drop across the filter would draw the gas through the filter.

I claim:

1. A device for obtaining a sample of gas bubbles entrained in a liquid which comprises:
    (a) a flow path for a portion of the liquid;
    (b) a filter within the flow path, said filter having holes of a diameter appropriate to require a pressure needed to force entrained gas bubbles through said filter holes to be greater than exists at said filter in said flow path due to the surface tension forces on said bubbles which opposes passage through said holes, said filter holes having a diameter ranging from about 10 $\mu$m to 100 $\mu$m;
    (c) a plenum disposed within said flow path to gather said gas bubbles which are prevented from passage through said filter, and
    (d) means for gathering and obtaining measurements on said gas bubbles as accumulated in said plenum.

2. A device for obtaining a sample of fission gas bubbles entrained in liquid metal coolant of a nuclear reactor which comprises:
    (a) a flow path for a portion of the liquid;
    (b) a filter within the flow path, said filter having holes of a diameter appropriate to prevent passage of entrained gas bubbles through said filter holes due to the surface tension forces on said bubbles which opposes passage through said holes, said filter holes having a diameter ranging from about 10 $\mu$m to 100 $\mu$m;
    (c) a plenum disposed within said flow path to gather said gas bubbles which are prevented from passage through said filter, and
    (d) means for gathering and obtaining measurements on said gas bubbles as are accumulated in said plenum.

3. The device of claim 2 wherein said coolant is liquid sodium.

4. The device of claim 2 wherein said filter holes are 100 $\mu$m in diameter.

5. The device of claim 2 wherein said path has means for injection of an inert gas upstream of said filter.

6. A device for monitoring a nuclear fuel assembly for rod cladding failure and subsequent fission gas release which comprises:
    (a) a path for passage of a portion of coolant flow after passage through said fuel assembly;
    (b) a first filter in said path having holes adapted to pass coolant therethrough but sufficiently small to prevent passage of entrained fission gas bubbles, said filter holes having a diameter ranging from about 10 $\mu$m to 100 $\mu$m;

(c) a plenum located within said path to gather fission gas bubbles which are denied passage through said first filter;

(d) a second small filter located in said path, such that a portion of coolant flow through said first filter passes through said second small filter and second filter located adjacent to said plenum such that said second small filter becomes gas blanketed by fission gas bubbles which gather in said plenum when cladding failure occurs; and (e) means for monitoring coolant flow through said second small filter, such flow indicative of cladding failure since the gas blanketing of said second filter by fission gas then released reduces said flow.

* * * * *